United States Patent
Guo (10) Patent No.: US 10,648,579 B2
(45) Date of Patent: May 12, 2020

(54) TWO-WAY FAUCET

(71) Applicant: KAIPING PASGO PLUMBING PRODUCTS CO., LTD., Kaiping, Guangdong (CN)

(72) Inventor: Baizhao Guo, Guangdong (CN)

(73) Assignee: KAIPING PASGO PLUMBING PRODUCTS CO., LTD., Kaiping (CN)

( * ) Notice: Subject to any disclaimer, the term of this patent is extended or adjusted under 35 U.S.C. 154(b) by 20 days.

(21) Appl. No.: 16/120,471

(22) Filed: Sep. 4, 2018

(65) Prior Publication Data

US 2019/0072193 A1 Mar. 7, 2019

(30) Foreign Application Priority Data

Sep. 4, 2017 (CN) .................. 2017 2 1127127 U (51) Int. Cl.
| | |
|---|---|
| *F16K 31/14* | (2006.01) |
| *F16K 11/18* | (2006.01) |
| *F16K 1/00* | (2006.01) |
| *F16K 31/44* | (2006.01) |
| *F16K 31/38* | (2006.01) |
| *E03C 1/04* | (2006.01) |

(52) U.S. Cl.
CPC .............. *F16K 11/18* (2013.01); *F16K 1/00* (2013.01); *F16K 31/14* (2013.01); *F16K 31/38* (2013.01); *F16K 31/44* (2013.01); *E03C 2001/0414* (2013.01); *E03C 2201/30* (2013.01)

(58) Field of Classification Search
None
See application file for complete search history.

(56) References Cited

U.S. PATENT DOCUMENTS

| | | | | |
|---|---|---|---|---|
| 2,314,071 | A * | 3/1943 | Bucknell ................ | E03C 1/042 137/119.04 |
| 6,062,249 | A * | 5/2000 | Givler ................... | F16K 11/048 137/119.04 |
| 7,216,663 | B2 * | 5/2007 | Vu ........................... | E03C 1/04 137/119.04 |
| 2004/0011399 | A1 * | 1/2004 | Segien, Jr. ............... | E03C 1/04 137/119.01 |
| 2005/0061368 | A1 * | 3/2005 | Agresta .................... | E03C 1/04 137/119.03 |
| 2019/0106866 | A1 * | 4/2019 | Clarke .................. | E03C 1/0404 |

* cited by examiner

*Primary Examiner* — John Fox (57) ABSTRACT

A two-way faucet includes a hollow faucet body; a rotatable water guide seat positioned in the faucet body; a rocker arm water guide assembly coupled to the rotatable water guide seat, the rocker arm water guide assembly including a supporting water guide seat and a supporting water guide tube in communication with the supporting water guide seat; a reversing outlet assembly assembled to one end of the supporting water guide tube afar from the supporting water guide seat, the reversing outlet assembly defining an upper outlet and a lower outlet; an outlet tube hermetically connected to the reversing outlet assembly and in communication with the upper outlet; and a shower outlet assembly having a switch assembled to one end of the outlet tube afar from the reversing outlet assembly, the shower outlet assembly being detachably supported on the supporting water guide seat.

9 Claims, 5 Drawing Sheets

TWO-WAY FAUCET

CROSS-REFERENCE TO RELATED APPLICATIONS

The present application claims priority to Chinese utility model application number 201721127127.5 filed on Sep. 4, 2017. The content of which is incorporated herein by reference in its entirety.

BACKGROUND OF THE INVENTION

Field of the Invention

The present application generally relates to kitchen faucets and, more specifically, relates to a two-way faucet.

Description of the Related Art

At present, kitchen faucets generally include pull-out faucets and rocker arm faucets. A pull-out faucet occupies too much space of the sink under the kitchen cabinet, and it is difficult to clean the tube thereof. A rocker arm faucet does not take up the space under the kitchen cabinet and is easy to clean. However, the cleaning range of the rocker arm faucet is much smaller, and it is also difficult to clean the fixed fork of the rocker arm spout.

In view of the foregoing, what is needed, therefore, is to provide a two-way faucet which can be cleaned conveniently and has water outlets which can be converted readily.

SUMMARY OF THE INVENTION

One object of the present application is to provide a two-way faucet which can be cleaned conveniently and has water outlets which can be converted readily.

According to one embodiment of the present application, a two-way faucet includes:
  a hollow faucet body;
  a rotatable water guide seat positioned in the faucet body;
  a rocker arm water guide assembly coupled to the rotatable water guide seat, the rocker arm water guide assembly comprising a supporting water guide seat and a supporting water guide tube in communication with the supporting water guide seat;
  a reversing outlet assembly assembled to one end of the supporting water guide tube afar from the supporting water guide seat, the reversing outlet assembly defining an upper outlet and a lower outlet;
  an outlet tube hermetically connected to the reversing outlet assembly and in communication with the upper outlet; and
  a shower outlet assembly having a switch assembled to one end of the outlet tube afar from the reversing outlet assembly, the shower outlet assembly being detachably supported on the supporting water guide seat; and
  wherein when the switch of the shower outlet assembly is closed and the shower outlet assembly is supported on the supporting water guide seat, the lower outlet is opened, and the water from the faucet boy flow out from the lower outlet via the rotatable water guide seat, the supporting water guide tube and the reversing outlet assembly; and
  when the shower outlet assembly is detached from the supporting water guide seat and the switch is opened, the lower outlet is closed, and the water from the faucet boy flow out from the upper outlet via the rotatable water guide seat, the supporting water guide tube and the reversing outlet assembly.

According to one aspect of the present application, a diverter body is arranged between the outlet tube and the reversing outlet assembly, the diverter body is provided with an upper opening and a lower opening, and the outlet tube is hermetically assembled to the diverter body and is rotatable relative to the diverter body.

According to one aspect of the present application, the rotatable water guide seat defines an annular groove, and a wear ring is received in the annular groove and seated between the rotatable water guide seat and the supporting water guide seat.

According to one aspect of the present application, the supporting water guide seat and the rotatable water guide seat are coupled to each other via threaded connection.

According to one aspect of the present application, the reversing outlet assembly includes a hollow valve body, a valve seat assembled in the valve body, and a valve cartridge seated in the valve seat and being capable of moving relative to the valve seat, when the shower outlet assembly is detached from the supporting water guide seat and the switch is opened, the valve cartridge abuts against the valve cartridge seat, the lower outlet is closed, and the water from the faucet boy flow out from the upper outlet of the reversing outlet assembly; when the switch of the shower outlet assembly is closed and the shower outlet assembly is supported on the supporting water guide seat, the valve cartridge is detached from the valve cartridge seat under a water pressure, the upper outlet is closed, and the water from the faucet boy flow out from the lower outlet of the reversing outlet assembly.

According to one aspect of the present application, the reversing outlet assembly includes a reversing valve body, a nozzle connector, a liner, a reversing valve cartridge seat, a valve rod, an upper valve cartridge and an lower valve cartridge,
  the reversing valve body defines a liner chamber, a nozzle connecting chamber, a valve cartridge seat chamber, an inlet chamber, an upper valve cartridge seat and an external thread joint;
  the valve rod includes an upper valve cartridge connecting portion, a lower valve cartridge connecting portion and a sliding guide restricting portion, the upper valve cartridge and the lower valve cartridge are formed on the upper connecting portion and the lower valve cartridge connecting portion, respectively;
  the reversing valve cartridge seat defines a lower opening, a lower valve cartridge seat is provided on an inner surface of a top plate thereof, a guide positioning portion is formed on the top in the form of annular distribution;
  an upper end of the diverter body is provided with an external thread joint, and a lower end is internally provided with an internal thread;
  a lower end of the valve rod passes through a screw hole on the lower valve cartridge seat and extends into the reversing valve cartridge seat, the lower valve cartridge is engaged with the lower valve cartridge seat, the sliding guide restricting portion of the valve rod is slidingly engaged with the water guide positioning portion; the reversing valve cartridge seat is formed in the valve cartridge seat chamber and the guide positioning portion extends into the inlet chamber, the upper valve cartridge is engaged with the upper valve cartridge seat; the nozzle connector is detachably connected with the nozzle connecting chamber, the liner is detachably engaged with the liner chamber; the external thread joint of the reversing valve body is screwed with the internal thread of the diverter body.

According to one aspect of the present application, the two-way faucet further includes a connecting sleeve, wherein the connecting sleeve includes an internal thread connecting portion, a connecting countersunk and an upper rotatable cavity portion, one end of the outlet tube is provided with a flange, the outlet tube extends through the connecting sleeve, the flange is in rotatable engagement with the connecting countersunk, and the internal thread connecting portion is screwed with the external thread joint of the water diversion body.

According to one aspect of the present application, the shower outlet assembly with a switch includes shower body, a water outlet head, a diverter rod, a diverter sleeve, a pressure spring and a button;

the shower body comprises a lower water outlet chamber, a switch chamber and an upper water inlet chamber, the upper water inlet chamber is communicated with a closed end of the switch chamber, an annular water groove is disposed on the switch chamber, the lower water outlet chamber is communicated with the annular water groove which is located in the middle of the switch chamber;

the diverter rod includes a valve cartridge portion, a water guide portion and a sliding connecting portion, the diverter sleeve is provided with a water inlet portion having a water inlet hole;

the diverter sleeve is disposed within the switch chamber, a gap between one end of the diverter sleeve and a closed end of the switch chamber defines a water guide chamber, and the water inlet portion corresponds to the annular water groove of the switch chamber;

the diverter rod is disposed within the diverter sleeve, the valve core portion is engaged with the diverter sleeve, the water guide portion corresponds to the water inlet portion; the button is fixed to the diverter rod, the pressure spring is engaged with the button and a spring seat which located at the end of the diverter sleeve, the upper water inlet chamber communicates with the outlet tube.

According to one aspect of the present application, a first magnet is provided on an internal face of the supporting water guide seat, one distal end of the show outlet assembly having a switch afar from the reversing outlet assembly is provided with a second magnet, and the show outlet assembly having a switch is detachably connected to the supporting water guide seat via magnetic attraction.

The two-way faucet of the present application can be cleaned conveniently and the water outlets thereof can be converted readily.

BRIEF DESCRIPTION OF THE DRAWINGS

Other advantages and novel features will be drawn from the following detailed description of preferred embodiments with the attached drawings. The accompanying drawings, which are incorporated in and constitute a part of this specification, illustrate embodiments of the present invention and, together with a general description of the invention given above, and the detailed description of the embodiments given below, serve to explain the principles of the invention, in which.

DETAILED DESCRIPTION OF PREFERRED EMBODIMENTS

Example embodiments of the present invention will now be described more fully hereinafter, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements.

Figure 1:
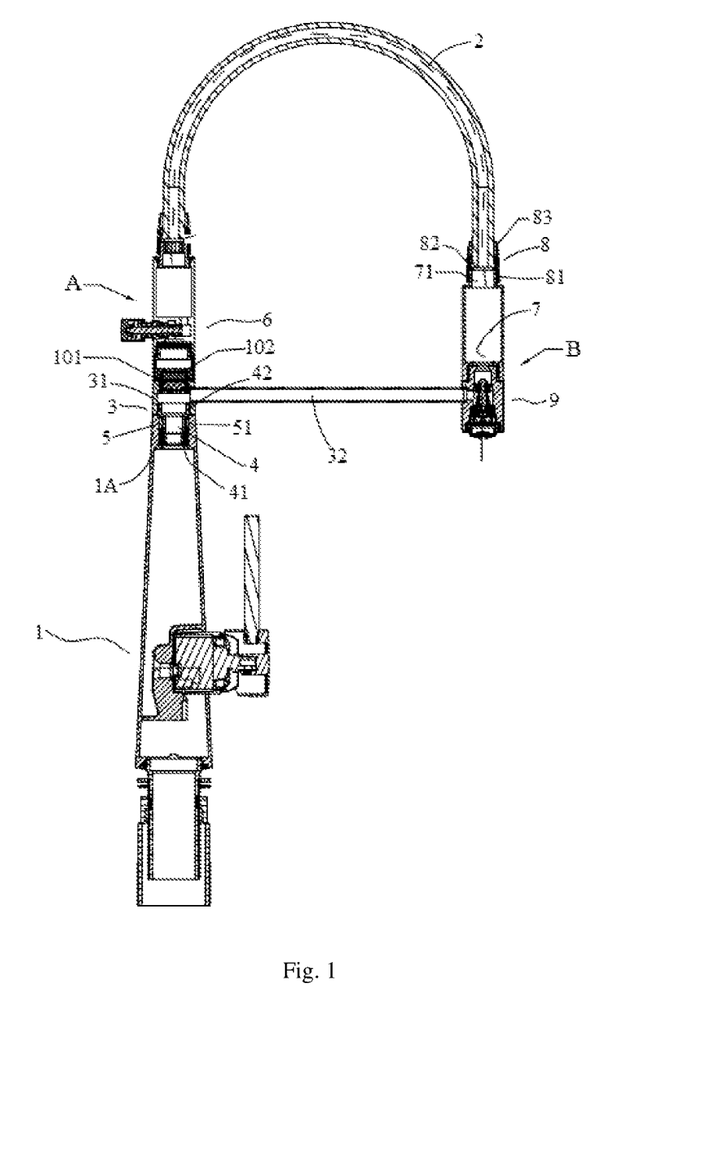
FIG. 1 depicts a cross-sectional view of a two-way faucet according to one embodiment of the present invention.
Figure 5:
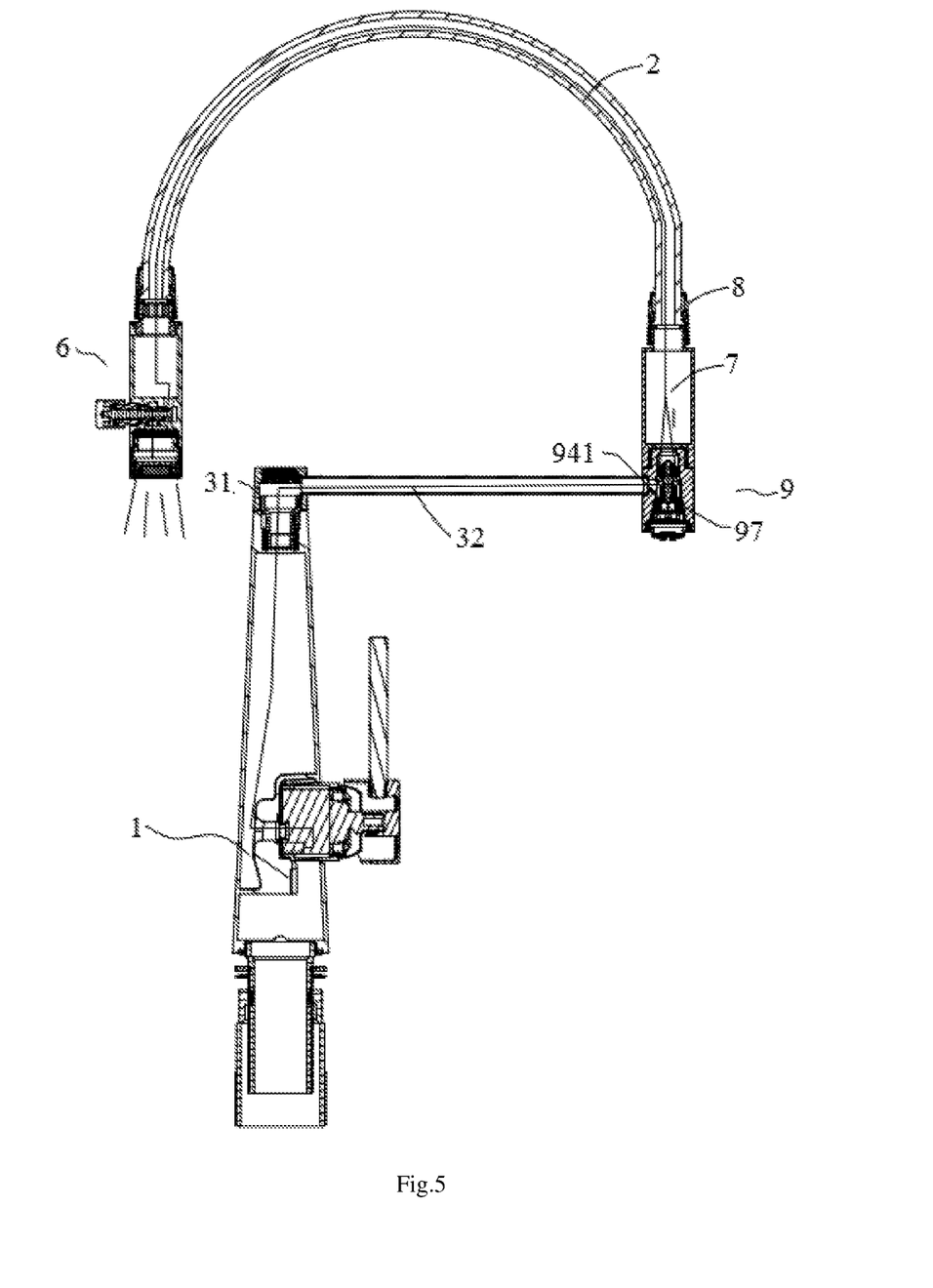
FIG. 5 depicts a cross-sectional view of a two-way faucet according to another embodiment of the present invention.

Referring to FIG. 1 and FIG. 5, a two-way faucet according to one embodiment of the present application includes a hollow faucet body 1 having a cold and hot water mixing valve cartridge assembly positioned therein and an outlet tube 2.

The two-way faucet further includes a rocker arm water guide assembly 3, a rotatable water guide seat 4, a wear ring 5, a shower outlet assembly 6 with a switch, a water diverter body 7 having an upper opening and a lower opening, a connecting sleeve 8 and an automatic reversing outlet assembly 9. An upper water outlet end of the faucet body 1 is provided a connecting chamber 1A having a radial screw hole (not shown).

The rocker arm water guide assembly 3 includes a supporting water guide seat 31 having a lower opening and a supporting water guide tube 32 communicated with the supporting water guide seat 31. The other end of the supporting water guide tube 32 is fixed to and communicated with the automatic reversing outlet assembly 9. The supporting water guide seat 31 is provided with an internal thread at the lower opening thereof.

A body portion 41 of the rotatable water guide seat 4 defines an annular groove. The wear ring 5 is disposed in the annular groove of a body portion 41. The body portion 41 is inserted into the connecting chamber 1A of the faucet body 1. A screw extends through the radial screw hole and engaged with a positioning hole 51 defined in the wear ring 5. The inner thread of the supporting water guide seat 31 is screwed with a upper thread interface portion 42 of the rotating water guide seat 4.

The water diverter body 7 is connected to the automatic reversing outlet assembly 9. One end of the outlet tube 2 is rotatably coupled to the water diverter body 7 and sealed in a liquid-tight manner. The other end of the outlet tube 2 is connected to the shower outlet assembly 6.

Referring to FIG. 1, in the first state, the shower outlet assembly 6 is supported by the supporting water guide seat 31, and the switch of the shower outlet assembly 6 is in a closed state, and water flows out of the automatic reversing outlet assembly 9. The water enters the automatic reversing outlet assembly 9 through the rotatable water guide seat 4, the supporting water guide seat 31 and the supporting water guide tube 32, and flows out of the automatic reversing outlet assembly 9. The supporting water guide seat 31 can rotate relative to the rotatable water guide seat 4, so as to change the position of the automatic reversing outlet assembly 9.

Referring to FIG. 5, in the second state, the shower outlet assembly 6 is detached from the supporting water guide seat 31. The automatic reversing outlet assembly 9 is communicated with the outlet tube 2. Water flows out of the shower outlet assembly 6. In use, the shower outlet assembly 6 is turned on via operating the switch of the shower outlet assembly 6. The shower outlet assembly 6 is detached from the supporting water guide seat 31, the automatic reversing outlet assembly 9 is reversed, and water flows out of the shower outlet assembly 6. When the state shifted from the first state to the second state, the automatic reversing outlet assembly 9 is automatically converted.

Figure 3:
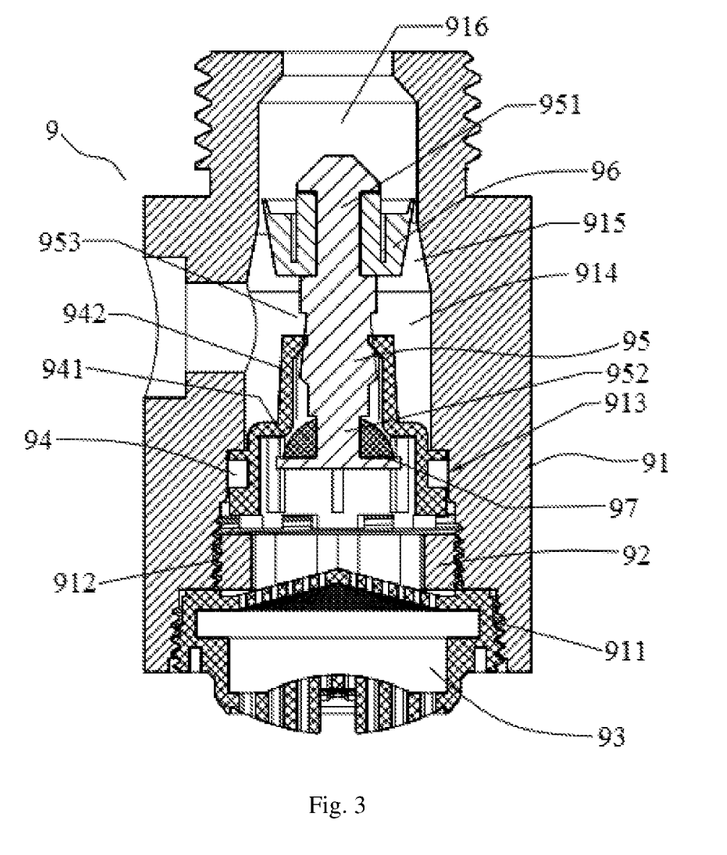
FIG. 3 depicts an exemplary enlarged view of portion B as shown in FIG. 1.

Referring to FIG. 1 and FIG. 3, the automatic reversing outlet assembly 9 includes a reversing valve body 91, a nozzle connector 92, a liner 93, a reversing valve cartridge seat 94, a valve rod 95, an upper valve cartridge 96 and a lower valve cartridge 97. The reversing valve body 91 includes a liner chamber 911, a nozzle connecting chamber 912, a valve cartridge seat chamber 913, an inlet chamber 914, an upper valve cartridge seat 915 and an external thread joint 916 from the bottom to the top.

The valve rod 95 includes an upper valve cartridge connecting portion 951, a lower valve cartridge connecting portion 952 and a sliding guide restricting portion 953. The upper valve cartridge 915 and the lower valve cartridge 916 are disposed on the upper connecting portion and the lower valve core connecting portion, respectively.

Figure 4:
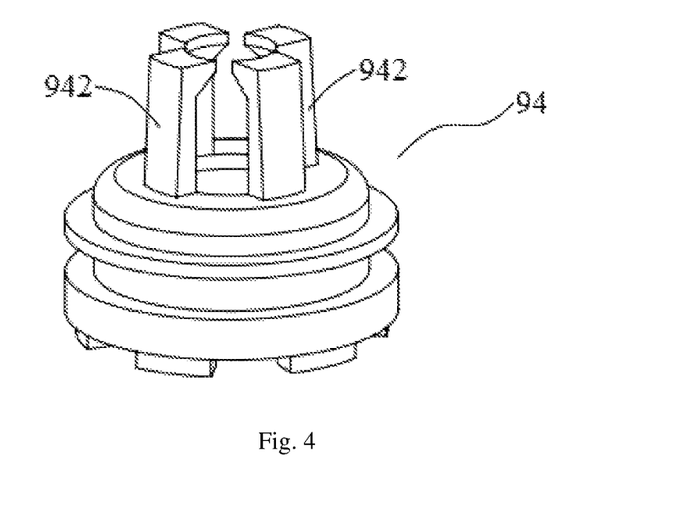
FIG. 4 depicts a perspective view of a reversing value core seat for use in the two-way faucet according to one embodiment of the present invention.

Referring to FIG. 3 and FIG. 4, the reversing value cartridge seat 94 has a lower opening. A lower valve cartridge seat 941 is provided on an inner surface of the top plate. A number of guide positioning portions 942 are formed on the top and arranged along a circle. The guide positioning portion 942 includes several connectors, and each connector includes a rod portion and a guide limiting head at the top of the rod portion, the guide limiting head slidingly engages the sliding guide restricting portion for positional restriction.

Referring to FIG. 1, the upper end of the diverter body 7 is provided with an external thread joint 71, and the lower end is provided with an internal thread.

A lower end of the valve rod 95 passes through a screw hole on the lower valve cartridge seat 941 and extends into the reversing valve cartridge seat 94. The lower valve cartridge 97 is engaged with the lower valve cartridge seat 941. The sliding guide restricting portion 953 of the valve rod 95 slidingly engages the guide positioning portion 942. The reversing valve cartridge seat 94 is formed in the valve cartridge seat chamber 913 and the guide positioning portion 942 extends into the inlet chamber 914. The upper valve cartridge 96 is engaged with the upper valve cartridge seat 915. The nozzle connector 92 is detachably coupled to the nozzle connecting chamber 912. The liner 93 is detachably coupled to the liner chamber 911. The external thread joint 916 of the reversing valve body 91 is screwed with the internal thread of the diverter body 7.

Referring to FIG. 1, from the bottom to the top, the connecting sleeve 8 includes an internal thread connecting portion 81, a connecting countersunk 82 and an upper rotating cavity portion 83. One end of the outlet tube 2 is provided with a flange.

The outlet tube 2 extends out of the connecting sleeve 8, the flange is in rotatable engagement with the connecting countersunk 82, and the internal thread connecting portion 81 is screwed with the external thread joint 71 of the diverter body 7. In this case, the outlet tube 2 can rotate relative to the diverter body 7.

Figure 2:
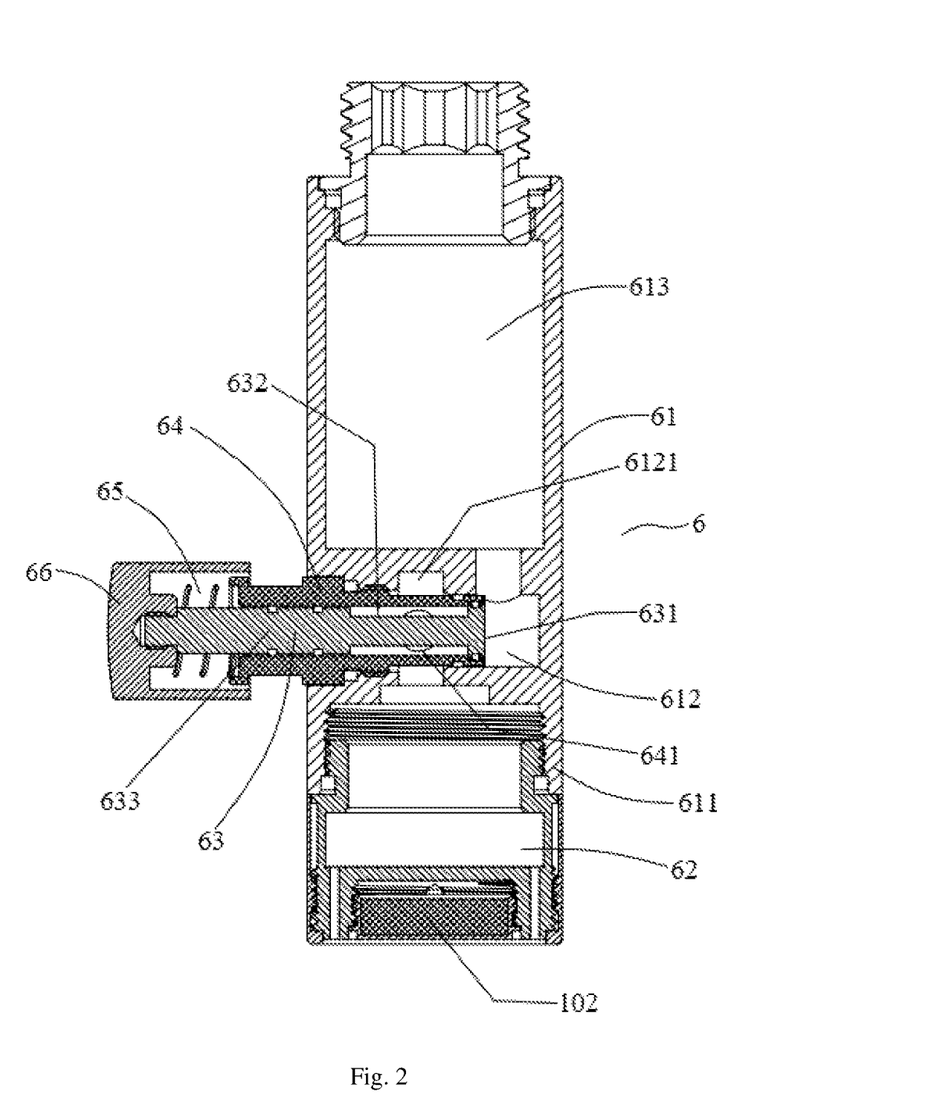
FIG. 2 depicts an exemplary enlarged view of portion A as shown in FIG. 1.

Referring to FIG. 2, the shower outlet assembly 6 with a switch includes a shower body 61, a water outlet head 62, a diverter rod 63, a diverter sleeve 64, a pressure spring 65 and a button 66. The shower body 61 includes a lower water outlet chamber 611, a switch chamber 612 and an upper water inlet chamber 613, and the upper water inlet chamber 613 is communicated with a closed end of the switch chamber 612. An annular water groove 6121 is provided in the switch chamber 612, and the lower water outlet chamber 611 is communicated with the annular water groove 6121 located in the middle portion of the switch chamber 612.

The diverter rod 63 includes a valve cartridge portion 631, a water guide portion 632 and a sliding connecting portion 633. The diverter sleeve 64 is provided with a water inlet portion having a water inlet hole 641.

The diverter sleeve 64 is disposed within the switch chamber 612. A gap between the end of the diverter sleeve 64 and the closed end of the switch chamber 612 forms a water guide chamber. The water inlet portion corresponds to the annular water groove 6121 of the switch chamber 612. The diverter rod 63 is disposed within the diverter sleeve 64. The valve cartridge portion 631 is engaged with the diverter sleeve 64. The water guide portion 632 corresponds to the water inlet portion. The button 66 is fixed to the diverter rod 63. The pressure spring 65 is engaged with a key 66 and a spring seat located at the end of the diverter sleeve 64. The upper water inlet chamber 613 communicates with the outlet tube 2.

Referring to FIG. 1, a first magnet 101 is provided on an internal face of the top plate of the supporting water guide seat 31.

Referring to FIG. 2, a lower end of the water outlet head 62 is provided with a second magnet 102. The supporting water guide seat 31 is detachably connected to the water outlet head 62 by means of a magnetic connection.

The supporting water guide seat 31 cooperates with the water outlet head 62, and the supporting water guide seat 31 closes the water outlet hole of the water outlet head 62.

When the state is shifted from the first state to the second state, press the button 66, the valve cartridge portion 631 of the diverter rod 63 detaches from the diverter sleeve 64 and enters the water guide chamber between the end portion of the diverter sleeve 64 and the closed end of the switch chamber 612. The water in the outlet tube 2 flows into the water outlet head 62 through the upper water inlet chamber 613, the water guide chamber, the water inlet hole 641 of the water inlet portion of the diverter sleeve 64 and the annular water groove 6121, and finally flows out of the water outlet head 62.

Referring to FIG. 1 and FIG. 3, in the first state, the automatic reversing outlet assembly 9 is in a conductive state, the lower valve cartridge 97 and the lower valve cartridge seat 941 are separated from each other. When the state is shifted from the first state to the second state, after pressing the button 66, the shower outlet assembly 6 with a switch detaches from the supporting water guide seat 31 and communicates the air, the shower outlet assembly 6, the outlet tube 2, the diverter body 7 and the reversing valve body 91 with each other. The upper valve cartridge plays a role of a float, under the effect of the water flow, the valve rod 95 moves upwardly. Referring to FIG. 5, the lower valve cartridge 97 is brought into close contact with the lower valve cartridge seat 941, the automatic reversing outlet assembly 9 is closed and the water flows out of the shower outlet assembly 6.

When the state is shifted from the second state to the first state, the switch of the shower outlet assembly 6 is closed, the water outlet head 62 cooperates with the supporting water guide seat 31, and the supporting water guide seat 31 closes the water outlet hole of the water outlet head 62. Due to the pressure of water flow, the lower value cartridge 97 moves downwardly, and the lower valve cartridge 97 and the lower valve cartridge seat 941 are separated from each other.

Compared with the conventional faucet, the two-way faucet of the present application can be cleaned conveniently and the water outlets thereof can be converted readily.

Many modifications and other embodiments of the inventions set forth herein will come to mind to one skilled in the art to which these inventions pertain having the benefit of the teachings presented in the foregoing descriptions. Therefore, it is to be understood that the inventions are not to be limited to the specific embodiments disclosed and that modifications and other embodiments are intended to be included within the scope of the appended claims. Moreover, although the foregoing descriptions describe example embodiments, it should be appreciated that alternative embodiments without departing from the scope of the appended claims. Although specific terms are employed herein, they are used in a generic and descriptive sense only and not for purposes of limitation.

What is claimed is:

1. A two-way faucet, comprising:
   a hollow faucet body;
   a rotatable water guide seat positioned in the faucet body;
   a rocker arm water guide assembly coupled to the rotatable water guide seat, the rocker arm water guide assembly comprising a supporting water guide seat and a supporting water guide tube in communication with the supporting water guide seat;
   a reversing outlet assembly assembled to one end of the supporting water guide tube afar from the supporting water guide seat, the reversing outlet assembly defining an upper outlet and a lower outlet;
   an outlet tube hermetically connected to the reversing outlet assembly and in communication with the upper outlet; and
   a shower outlet assembly having a switch assembled to one end of the outlet tube afar from the reversing outlet assembly, the shower outlet assembly being detachably supported on the supporting water guide seat; and
   wherein when the switch of the shower outlet assembly is closed and the shower outlet assembly is supported on the supporting water guide seat, the lower outlet is opened, and the water from the faucet body flow out from the lower outlet via the rotatable water guide seat, the supporting water guide tube and the reversing outlet assembly; and
   when the shower outlet assembly is detached from the supporting water guide seat and the switch is opened, the lower outlet is closed, and the water from the faucet body flow out from the upper outlet via the rotatable water guide seat, the supporting water guide tube and the reversing outlet assembly.

2. The two-way faucet of claim 1, wherein a diverter body is arranged between the outlet tube and the reversing outlet assembly, the diverter body is provided with an upper opening and a lower opening, and the outlet tube is hermetically assembled to the diverter body and is rotatable relative to the diverter body.

3. The two-way faucet of claim 1, wherein the rotatable water guide seat defines an annular groove, a wear ring is received in the annular groove and seated between the rotatable water guide seat and the supporting water guide seat.

4. The two-way faucet of claim 1, wherein the supporting water guide seat and the rotatable water guide seat are coupled to each other via threaded connection.

5. The two-way faucet of claim 1, wherein the reversing outlet assembly comprises a hollow valve body, a valve seat assembled in the valve body, and a valve cartridge seated in the valve seat and being capable of moving relative to the valve seat, when the shower outlet assembly is detached from the supporting water guide seat and the switch is opened, the valve cartridge abuts against the valve cartridge seat, the lower outlet is closed, and the water from the faucet body flow out from the upper outlet of the reversing outlet assembly; when the switch of the shower outlet assembly is closed and the shower outlet assembly is supported on the supporting water guide seat, the valve cartridge is detached from the valve cartridge seat under a water pressure, the upper outlet is closed, and the water from the faucet body flow out from the lower outlet of the reversing outlet assembly.

6. The two-way faucet of claim 1, wherein the reversing outlet assembly comprises a reversing valve body, a nozzle connector, a liner, a reversing valve cartridge seat, a valve rod, an upper valve cartridge and an lower valve cartridge,
   the reversing valve body defines a liner chamber, a nozzle connecting chamber, a valve cartridge seat chamber, an inlet chamber, an upper valve cartridge seat and an external thread joint;
   the valve rod comprises an upper valve cartridge connecting portion, a lower valve cartridge connecting portion and a sliding guide restricting portion, the upper valve cartridge and the lower valve cartridge are formed on the upper connecting portion and the lower valve cartridge connecting portion, respectively;
   the reversing valve cartridge seat defines a lower opening, a lower valve cartridge seat is provided on an inner surface of a top plate thereof, a guide positioning portion is formed on the top in the form of annular distribution;
   an upper end of the diverter body is provided with an external thread joint, and a lower end is internally provided with an internal thread;
   a lower end of the valve rod passes through a screw hole on the lower valve cartridge seat and extends into the reversing valve cartridge seat, the lower valve cartridge is engaged with the lower valve cartridge seat, the sliding guide restricting portion of the valve rod is slidingly engaged with the water guide positioning portion; the reversing valve cartridge seat is formed in the valve cartridge seat chamber and the guide positioning portion extends into the inlet chamber, the upper valve cartridge is engaged with the upper valve cartridge seat; the nozzle connector is detachably connected with the nozzle connecting chamber, the liner is detachably engaged with the liner chamber; the external thread joint of the reversing valve body is screwed with the internal thread of the diverter body.

7. The two-way faucet of claim 6, further comprising a connecting sleeve, wherein the connecting sleeve comprises an internal thread connecting portion, a connecting countersunk and an upper rotatable cavity portion, one end of the outlet tube is provided with a flange, the outlet tube extends through the connecting sleeve, the flange is in rotatable engagement with the connecting countersunk, and the internal thread connecting portion is screwed with the external thread joint of the water diversion body.

8. The two-way faucet of claim 1, wherein the shower outlet assembly with a switch comprises shower body, a water outlet head, a diverter rod, a diverter sleeve, a pressure spring and a button;

the shower body comprises a lower water outlet chamber, a switch chamber and an upper water inlet chamber, the upper water inlet chamber is communicated with a closed end of the switch chamber, an annular water groove is disposed on the switch chamber, the lower water outlet chamber is communicated with the annular water groove which is located in the middle of the switch chamber;

the diverter rod comprises a valve cartridge portion, a water guide portion and a sliding connecting portion, the diverter sleeve is provided with a water inlet portion having a water inlet hole;

the diverter sleeve is disposed within the switch chamber, a gap between one end of the diverter sleeve and a closed end of the switch chamber defines a water guide chamber, and the water inlet portion corresponds to the annular water groove of the switch chamber;

the diverter rod is disposed within the diverter sleeve, the valve core portion is engaged with the diverter sleeve, the water guide portion corresponds to the water inlet portion; the button is fixed to the diverter rod, the pressure spring is engaged with the button and a spring seat which located at the end of the diverter sleeve, the upper water inlet chamber communicates with the outlet tube.

9. The two-way faucet of claim 1, wherein a first magnet is provided on an internal face of the supporting water guide seat, one distal end of the show outlet assembly having a switch afar from the reversing outlet assembly is provided with a second magnet, and the show outlet assembly having a switch is detachably connected to the supporting water guide seat via magnetic attraction.

\* \* \* \* \*